(12) United States Patent
Pruna, Jr.

(10) Patent No.: US 12,397,909 B2
(45) Date of Patent: Aug. 26, 2025

(54) SUPPLEMENTARY LIFT GENERATION SYSTEM FOR MULTICOPTER ROTORCRAFT

(71) Applicant: Mihai Pruna, Jr., Amesbury, MA (US)

(72) Inventor: Mihai Pruna, Jr., Amesbury, MA (US)

( * ) Notice: Subject to any disclaimer, the term of this patent is extended or adjusted under 35 U.S.C. 154(b) by 0 days.

(21) Appl. No.: 18/408,282

(22) Filed: Jan. 9, 2024

(65) Prior Publication Data

US 2025/0223028 A1 Jul. 10, 2025

Related U.S. Application Data

(60) Provisional application No. 63/478,841, filed on Jan. 6, 2023.

(51) Int. Cl.
*B64C 27/02* (2006.01)
*B64U 10/11* (2023.01)
*B64U 10/16* (2023.01)
*B64U 30/297* (2023.01)

(52) U.S. Cl.
CPC ......... *B64C 27/024* (2013.01); *B64C 27/025* (2013.01); *B64U 10/11* (2023.01); *B64U 10/16* (2023.01); *B64U 30/297* (2023.01)

(58) Field of Classification Search
CPC ...... B64U 10/16; B64U 10/11; B64U 30/297; B64U 40/20; B64C 27/52; B64C 27/024; B64C 27/025
See application file for complete search history.

(56) References Cited

U.S. PATENT DOCUMENTS

| | | | |
|---|---|---|---|
| 6,863,241 B2* | 3/2005 | Sash | B64C 3/385 244/12.4 |
| 11,396,370 B2* | 7/2022 | Bernard | B64C 27/10 |
| 11,718,390 B2* | 8/2023 | Sinusas | B64C 27/08 244/17.21 |
| 2004/0075017 A1* | 4/2004 | Sash | B64C 29/0033 244/10 |
| 2004/0232280 A1* | 11/2004 | Carter | B64C 27/52 244/17.25 |
| 2007/0158494 A1* | 7/2007 | Burrage | B64C 39/04 244/7 R |
| 2021/0031908 A1* | 2/2021 | Sinusas | B64C 27/08 |
| 2021/0291971 A1* | 9/2021 | Bernard | B64C 27/80 |
| 2021/0323659 A1* | 10/2021 | Zhang | B64C 27/26 |
| 2024/0400199 A1* | 12/2024 | Kastiel | B64C 27/26 |

* cited by examiner

*Primary Examiner* — Joshua J Michener
*Assistant Examiner* — Arfan Y. Sinaki

(57) ABSTRACT

A rotorcraft comprising of a fuselage, a plurality of arms on which electric motors driving propellers are mounted, one or a plurality of pivoting rotor supports on which thrust generating rotors with one or a plurality of blades attach. The rotor supports are substantially vertical when the aircraft is flying vertically, hovering, or on the ground, and tilted with respect to the aircraft when the aircraft has a forward motion component. The rotors are configured to be powered on the ground, in hover, or in vertical flight, and spin in autorotation in horizontal flight.

7 Claims, 22 Drawing Sheets

SUPPLEMENTARY LIFT GENERATION SYSTEM FOR MULTICOPTER ROTORCRAFT

CROSS-REFERENCE TO RELATED APPLICATIONS

This application claims the benefit of U.S. Provisional Application No. 63/478,841, filed Jan. 6, 2023.

BACKGROUND OF THE INVENTION

Embodiments of the present invention relate to improving the range and endurance of vertical take-off and landing rotorcraft. More particularly, they provide means for generating extra lift in an efficient manner during cruise for multicopter rotorcraft.

Several types of rotorcraft are in widespread use. A helicopter has one or two rotors, where the rotor blade pitch is varied to provide lift and propulsive and maneuvering forces. Helicopters are the most capable and most widely used type of rotorcraft, and the most complex. With this complexity comes added costs and reliability issues. Two other types of rotorcraft are multicopters and autogyros, the latter also known as gyrocopters.

A multicopter is a type of rotorcraft with several rotors that provide lift, horizontal thrust, and maneuvering ability. The multicopter flies horizontally by pitching to a nose-down attitude to create a forward component to the thrust vectors of the rotors. The most popular type of multicopter, the quadcopter, has four rotors. Vertical Take-off and Landing (VTOL) multicopter rotorcraft rely on a plurality of high rotational speed, usually fixed pitch rotors to provide lift, horizontal propulsion, and maneuvering capabilities by varying the rotational speed of combinations of rotors. The rotors are, when compared to helicopters, short in span and less efficient due to high drag and blade tip losses. Henceforth this disclosure will refer to powered rotors on multicopters as propellers to differentiate them from elements of the current invention.

Most iterations of multicopter rotorcraft use electric motors to drive the propellers at high revolutions per minute (RPM). Power for the motors is supplied by onboard batteries. Battery technology for such power-hungry applications has a low power capacity to weight ratio. Aerodynamic inefficiencies and low battery performance are two of the reasons the range and endurance of multicopters are limited when compared to fixed wing aircraft and helicopters. Multicopters are presently used mostly as drones for photography and videography, applications where range and endurance are not critical. More recently, there have been attempts towards building and certifying multicopters for the transporting of cargo and people. However, the range limitations have kept these vehicles impractical.

Another type of rotorcraft is the autogyro, also known as a gyrocopter. Henceforth the term gyrocopter will be used for the type of rotorcraft described in this paragraph. A gyrocopter usually has a propeller that drives it forward, while an unpowered rotor generates lift through the principle of autorotation: the blades of the rotor act like sails and are driven by the relative wind generated by the forward motion of the aircraft. Compared to a helicopter, the gyrocopter has the advantage of a relatively simple rotor assembly. Unlike on a helicopter, the rotor blade pitch does not need to be changed to control the rotorcraft. Instead, the pilot tilts the entire rotor assembly to change the flight path. Because the gyrocopter rotor relies on relative wind to generate thrust, the gyrocopter is not controllable in hover flight, which puts it at a disadvantage versus helicopters and multicopters for confined area operations. At the same time, gyrocopters are more affordable to operate than helicopters, while having better range than multicopters.

It is thus recognized that if the range and endurance of the gyrocopter and the relative simplicity of the multicopter were combined, a rotorcraft rivaling the helicopter in performance and costing less than the helicopter to operate would be created.

SUMMARY OF THE INVENTION

In view of the foregoing, embodiments of the present invention advantageously provide one or a plurality of tilting rotor support assemblies attached to a multicopter rotorcraft. One or a plurality of rotors with one or a plurality of blades are attached to the tilting rotor supports. The tilting rotor supports can pivotally change the direction vector of the rotation axes of the rotors. When the multicopter is flying horizontally in a nose-low pitch attitude, the rotor supports are tilted back, allowing relative air flow to induce autorotation in the rotors.

For the purposes of this disclosure, cruise, horizontal flight, and horizontal motion refer to the dominant vector component of the flight direction. Vertical flight refers to moving only vertically or with a small horizontal velocity component. In most embodiments, the rotor is in the vertical flight configuration while the rotorcraft is on the ground, in vertical flight, and while the rotorcraft is hovering. With regards to the angle of tilt of the rotor mast, the vertical flight configuration implies the rotor mast is substantially perpendicular to the aircraft's fuselage.

The tilting rotor support keeps the rotor weight and lift vectors aligned with the rotorcraft's center of gravity in some embodiments, also allowing the rotor to operate in a state of autorotation while the multicopter is moving horizontally through the air.

The tilting rotor support assembly comprises a hinge bracket and a rotor support arm pivotally connected to the hinge bracket. The rotor support arm can pivot from substantially vertical to a position that complements the rotorcraft in cruise flight, resting on a backstop either attached directly to the rotorcraft or to the hinge bracket. The hinge bracket includes at least a forward stop or other means to restrain forward tilt of the rotor support arm. The hinge bracket can be built into the top of the fuselage or attached as an accessory to a multicopter. A hinge bracket with a backstop will henceforth be referred to as a full-back hinge and a hinge lacking said backstop as a backless hinge.

In some embodiments, the rotor support arm placed in a substantially vertical position provides clearance between the rotor and the ground during ground operations, take-off, and landing.

In some embodiments of the present invention, the forces of thrust from the propellers, thrust from the autorotating rotor, drag, and weight balance to achieve stable flight over the multicopter's envelope. Depending on embodiment, this can be achieved by placing the rotor support hinge close to the vehicle's center of gravity, by tilting the rotor support, and by varying the rotational speed of the motors.

In some embodiments of the present invention, the rotor attached to the tilting support can be powered to spin while in vertical flight and can spin in autorotation while the rotorcraft is moving horizontally.

In some embodiments of the present invention, the rotor attached to the tilting support is prevented from spinning while the rotorcraft is not moving horizontally.

In some embodiments of the present invention, maneuvers are accomplished by varying the RPM of one or a plurality of propellers.

In some embodiments of the present invention, the rotor support can be tilted by a pilot or autopilot to change the direction of thrust and thereby effect maneuvers.

In some embodiments of the present invention, the rotor blade pitch can be changed by the pilot or autopilot in flight or on the ground.

In some embodiments of the present invention, the autorotation starts automatically through leverage of aerodynamic effects on the rotor caused by the transition to cruise flight.

In some embodiments of the present invention one or a plurality of control surfaces attached to the rotor support can leverage air flow to generate forces to perform the transition of the rotor support assembly from vertical flight to cruise configuration.

DETAILED DESCRIPTION OF THE INVENTION

The present invention will be described in more detail hereinafter with references to the included drawings, which illustrate some embodiments of the present invention.

The invention can be embodied in different forms not limited to the embodiments illustrated or described herein. In particular, the number of autorotating rotors can vary.

Figure 1:
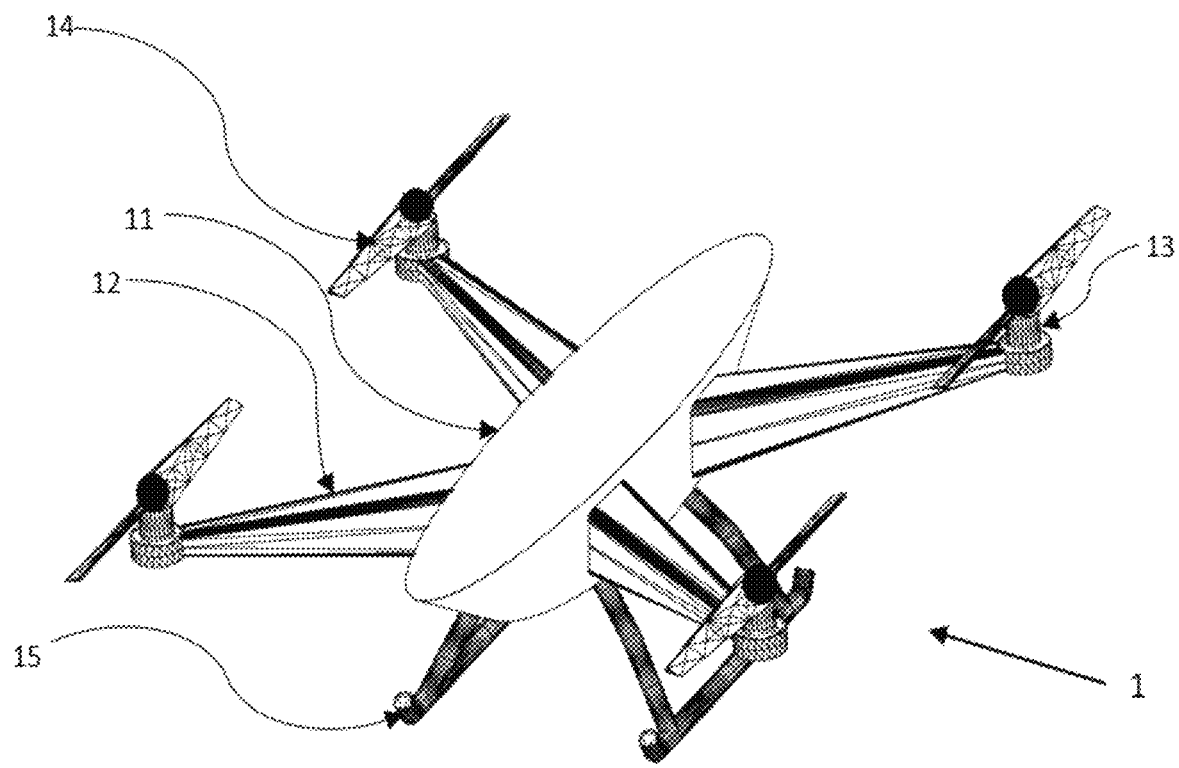
FIG. 1 shows a quadcopter as an example of prior art.

Rotorcraft 1 in FIG. 1 is an example of prior art. Rotorcraft 1 is a typical unmanned multicopter, a quadcopter drone consisting of fuselage 11, arms 12, motors 13, propellers 14 and landing gear 15. Fuselage 11 typically contains a power source such as batteries or other means to store and distribute power to motors 13.

Figure 2:
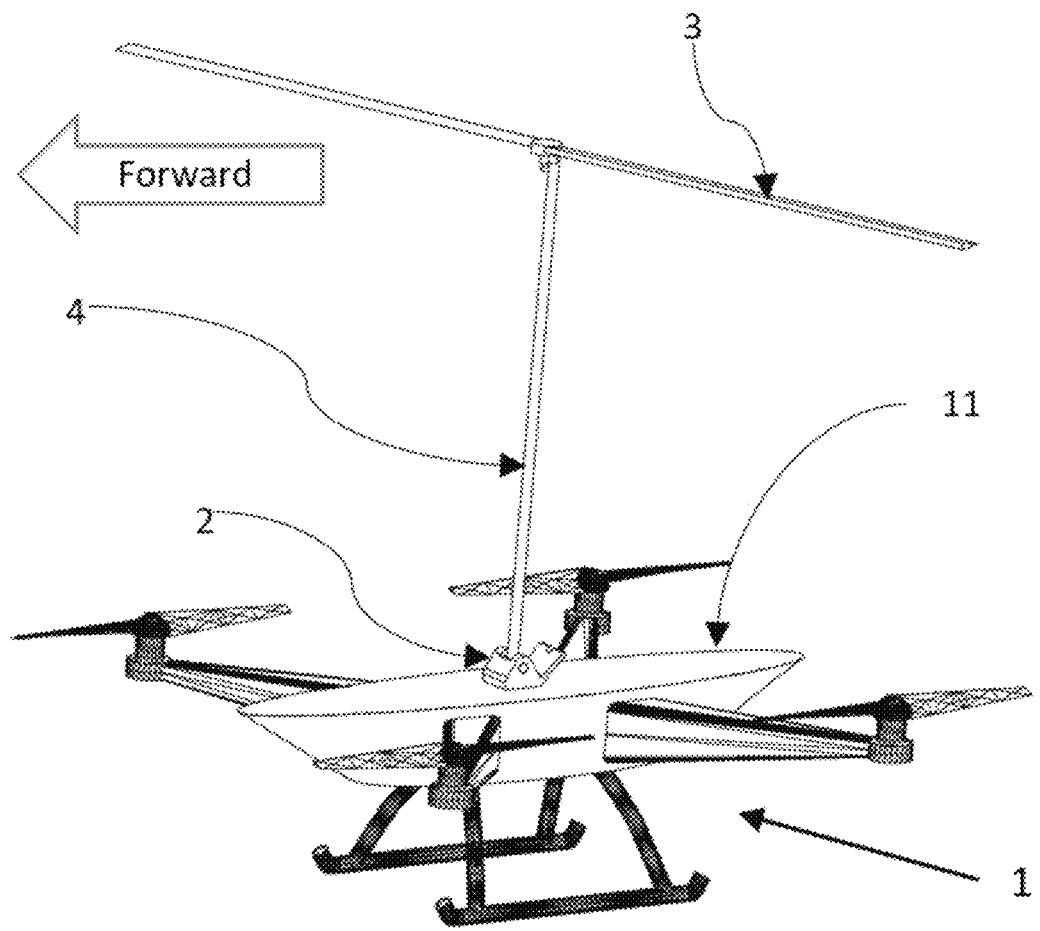
FIG. 2 represents a rotorcraft embodiment of the present invention with a full-back hinge bracket in vertical flight configuration.
Figure 3:
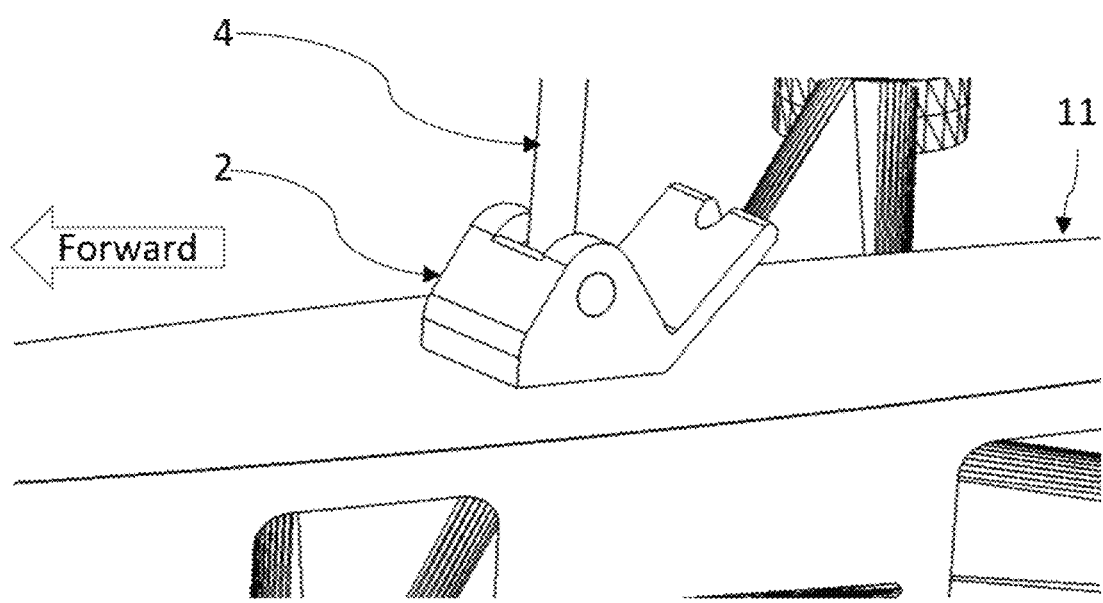
FIG. 3 is a detail view of a full-back hinge bracket in vertical flight configuration.
Figure 6:
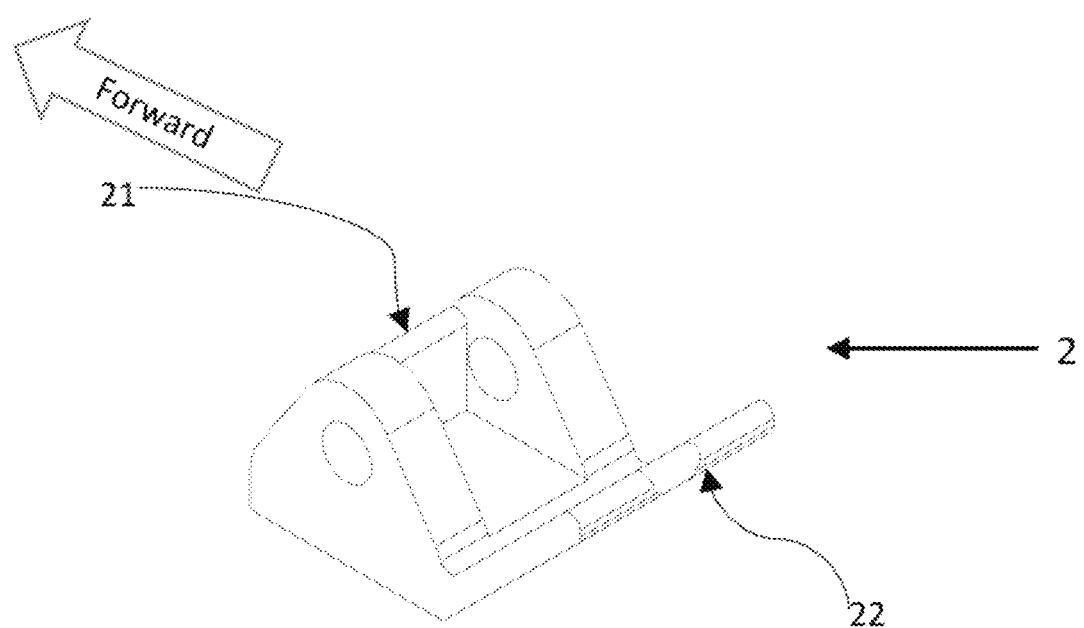
FIG. 6 is an isometric view of a full-back hinge bracket.

Referring to FIGS. 2, 3 and 6, shown is an embodiment of the current invention mounted on fuselage 11 of rotorcraft 1. Rotor support 4 is pivotally connected to full-back hinge bracket 2 and pivoted in a vertical flight configuration, in contact with forward stop 21. Rotor 3 is mounted on rotor support 4.

Figure 4:
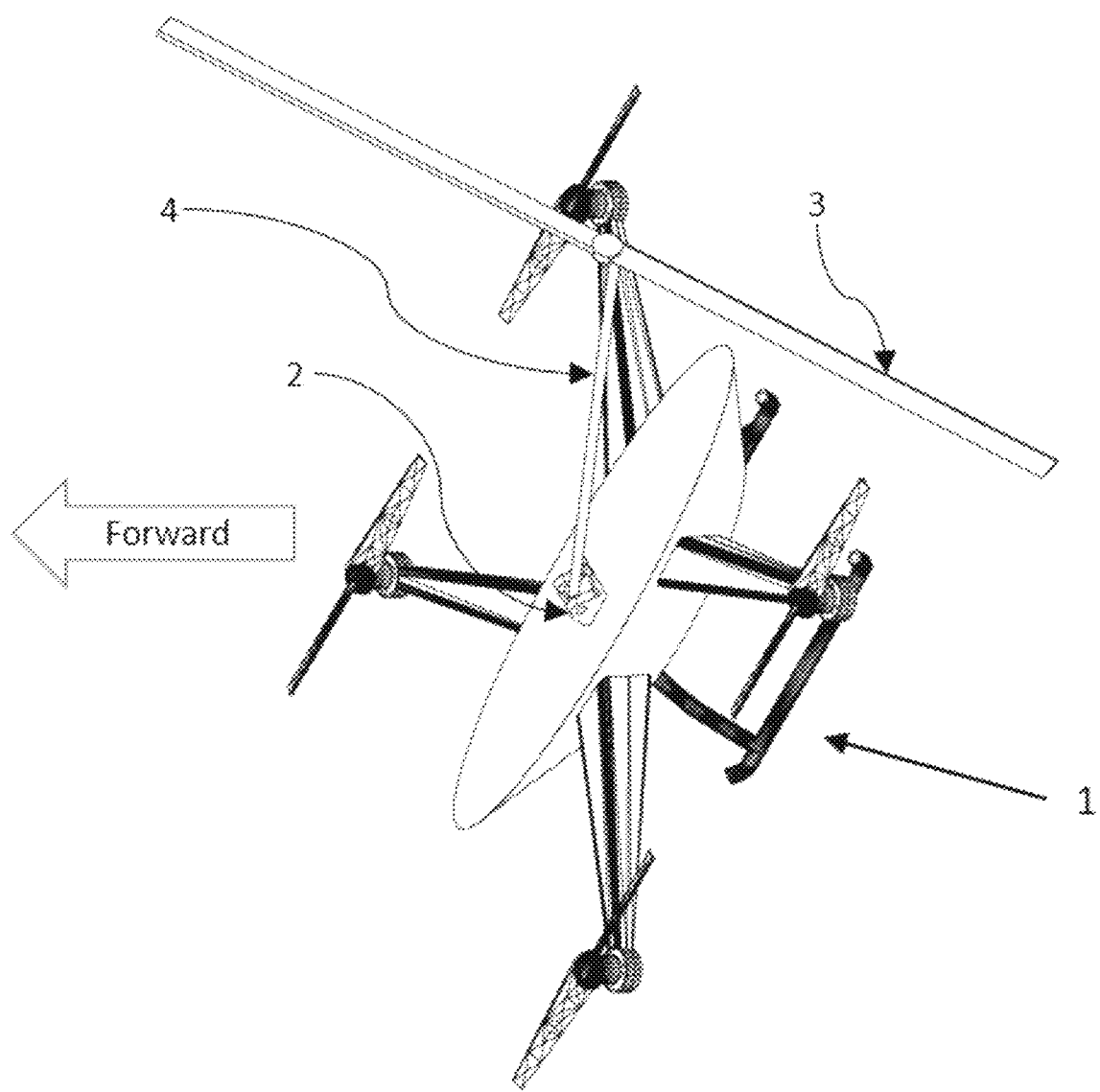
FIG. 4 is an isometric view of a rotorcraft embodiment with full-back hinge bracket, configured for horizontal or cruise flight.
Figure 5:
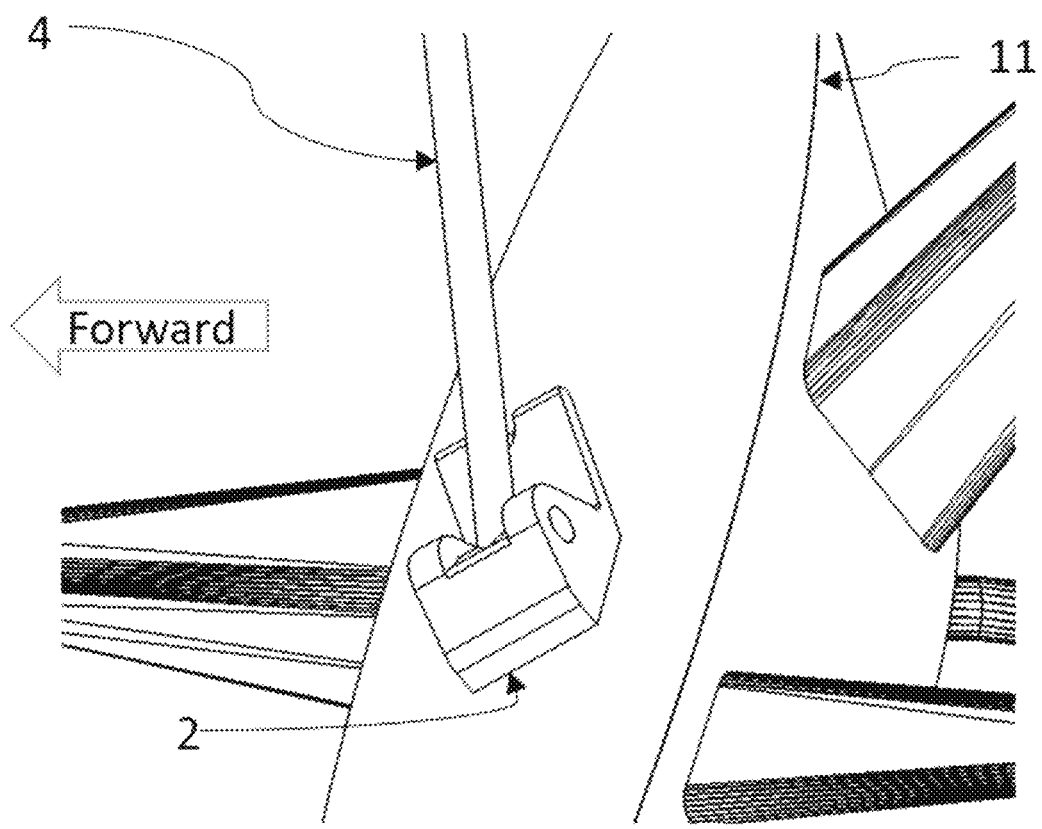
FIG. 5 is a detail of an embodiment of full-back hinge bracket with the rotor support configured for horizontal or cruise flight.

Referring to FIGS. 4, 5 and 6, shown is an embodiment of the current invention mounted on fuselage 11 of rotorcraft 1. Rotorcraft 1 is in a nose-low forward flight configuration. Rotor support 4 is attached to full-back hinge bracket 2 and pivoted in a horizontal flight configuration, resting on backstop 22. Rotor 3 is mounted on rotor support 4 and is operating in autorotation. In some embodiments, air resistance of the rotor 3 and rotor support 4 causes the rotor support to pivot to cruise configuration as the rotorcraft starts moving forward. In some embodiments, a servomotor will power the transition. While the design and functionality of hinge bracket 2 can vary in embodiments, its main purpose is to provide means for pivotally displacing and restraining rotor support 4.

Figure 10:
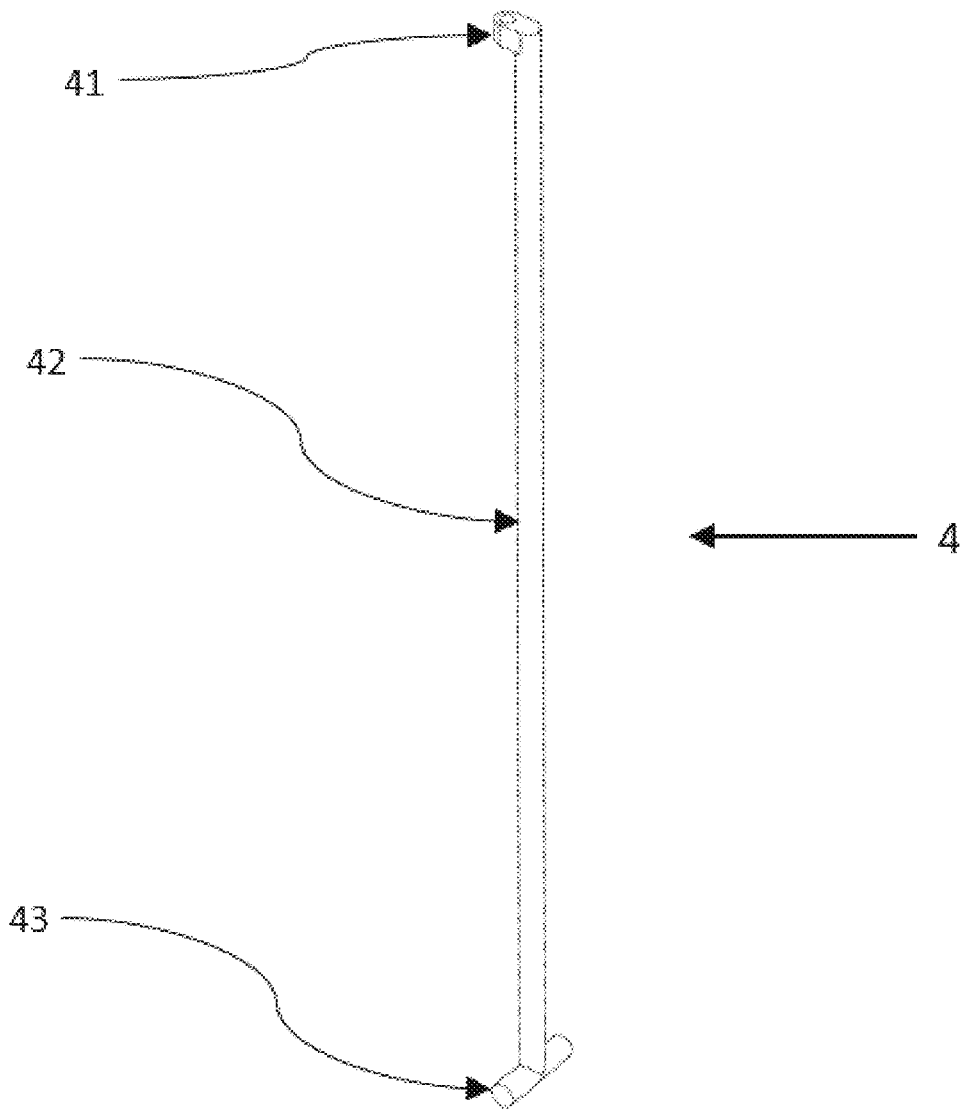
FIG. 10 shows an embodiment of a pivoting rotor support.

Referring to FIGS. 3, 6 and 10, shown are details of an embodiment of hinge bracket 2 and rotor support 4 pivoted in the vertical flight configuration. Fulcrum 43 placed in hinge 2 allows the rotor support to pivot from substantially vertical to cruise configuration and back. The pivot mechanism can vary in embodiments. In some embodiments, rotor support arm 42 is restrained from pitching forward by forward stop 21.

Referring to FIGS. 5, 6 and 10, shown are details of an embodiment of hinge bracket 2 and rotor support 4 pivoted in the cruise configuration. In some embodiments, rotor support arm 42 is restrained from pitching back beyond the desired amount by backstop 22.

Figure 8:
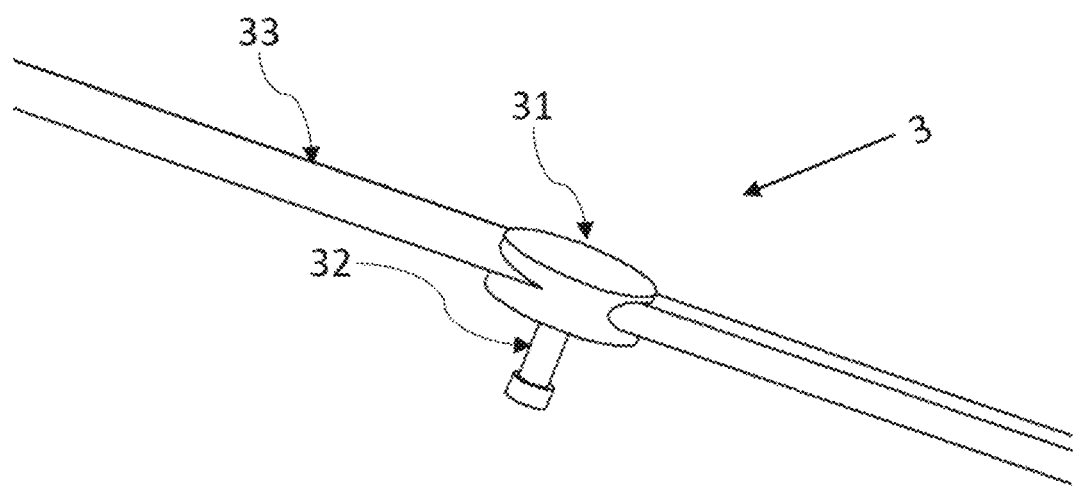
FIG. 8 is an embodiment of a rotor including hub and mast.
Figure 9:
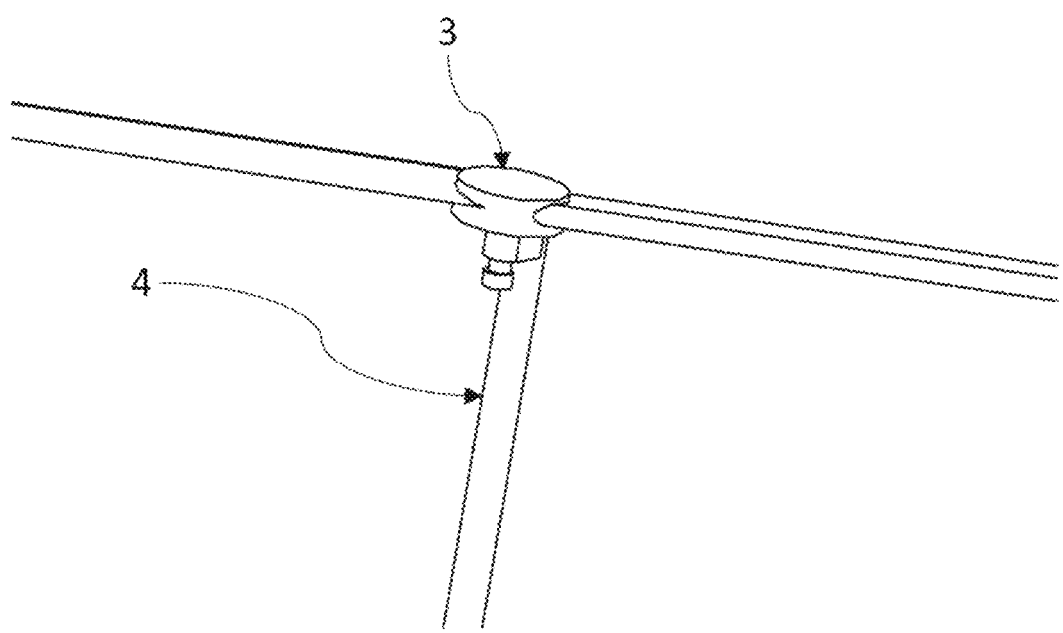
FIG. 9 shows a detail view of the rotor attached to an embodiment of a rotor support.

Referring to FIGS. 8, 9 and 10, shown is an embodiment of rotor 3 and the means of attaching rotor 3 to rotor support 4. Rotor mast 32 is in some embodiments inside ring 41, where rotor 3 can spin freely. Rotor blades 33 are mounted on rotor hub 31 via mechanisms that can vary in embodiments. The blade pitch can be fixed to, or set to, an angle which allows the blades to generate lift under the principles of autorotation. The number of blades, blade hinging mechanism, blade airfoil and other attributes can vary in embodiments. The rotor hub and mast design can vary in embodiments. In some embodiments, the pitch of the rotor blades can be adjusted on the ground or in flight. In some embodiments the rotor is removable for rotorcraft storage or for certain missions. In some embodiments the rotor support is removable for rotorcraft storage or for certain missions.

Figure 7:
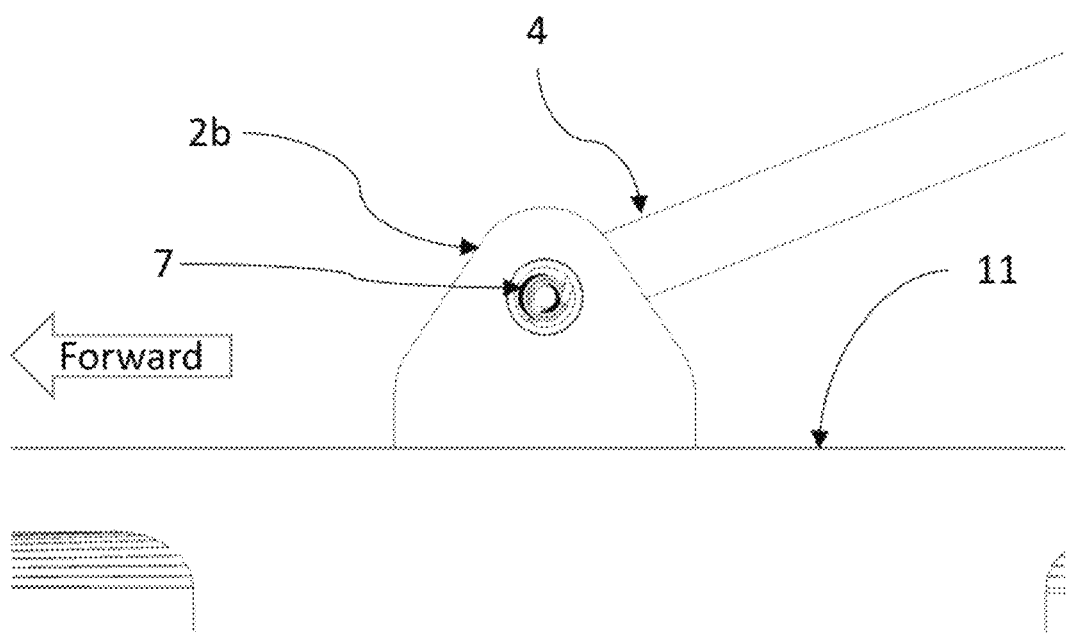
FIG. 7 is an embodiment of a rotor support tilt control system.

Referring to FIGS. 7, 9 and 10, restraint 7 is an embodiment of a system comprising springs, dampeners, or other means used in some embodiments of the present invention to keep rotor support 4 vertical until the rotorcraft has achieved sufficient airspeed in the horizontal direction, and to return the rotor support to the vertical position once the airspeed has dropped back below a prescribed value. In some embodiments, the tilt of the rotor support can be controlled by the pilot or by the autopilot using servomotors, hydraulics, direct linkage, or other means. Depending on embodiments, the means of restraint are inside rotor support fulcrum 43, surrounding the fulcrum inside hinge bracket 2b, or replacing the fulcrum altogether. In some embodiments, rotor support arm 42 is a flexible rod fixed to fuselage 11. The flexible rotor support arm can bend when the rotorcraft is under horizontal motion to bring rotor 3 to a position that generates thrust through autorotation.

Figure 11:
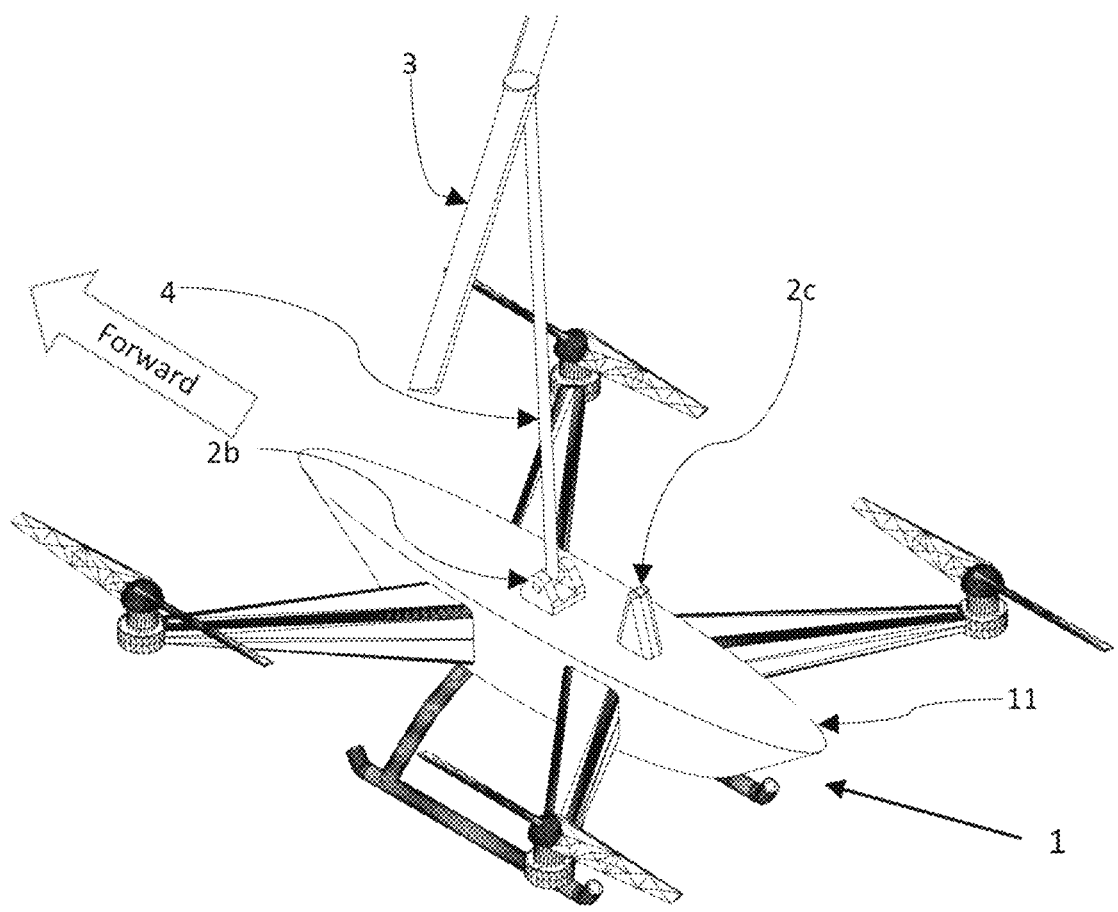
FIG. 11 shows a rotorcraft embodiment with a backless rotor support hinge bracket in vertical flight configuration.
Figure 12:
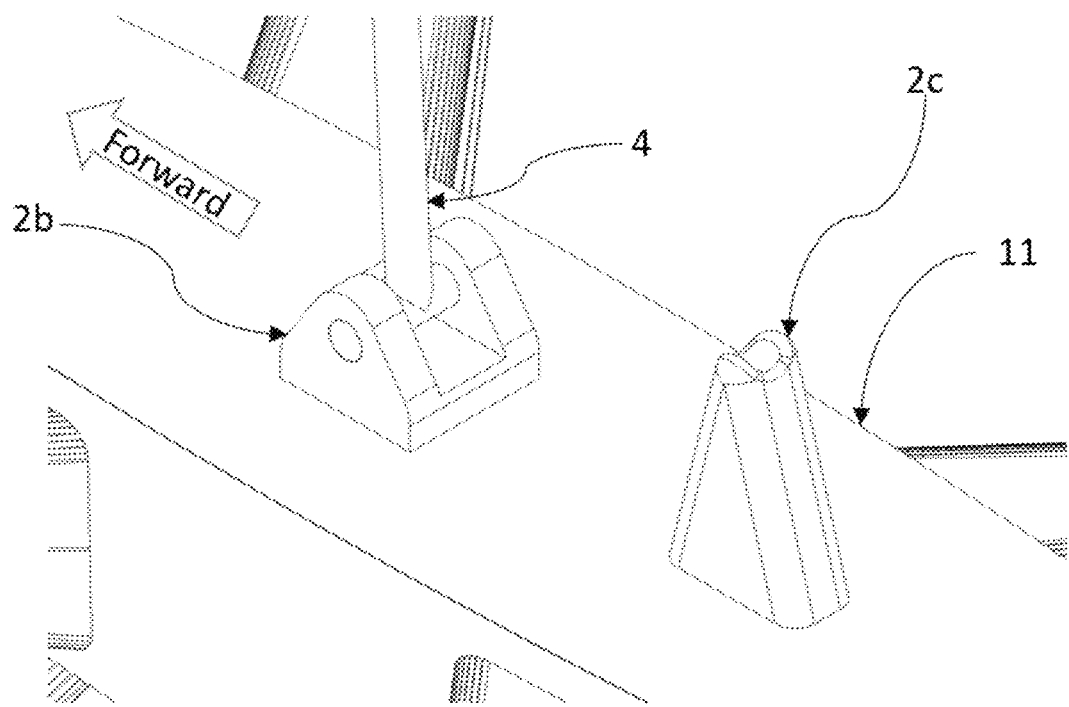
FIG. 12 is a detail view of the backless hinge bracket and backstop in vertical flight configuration.
Figure 13:
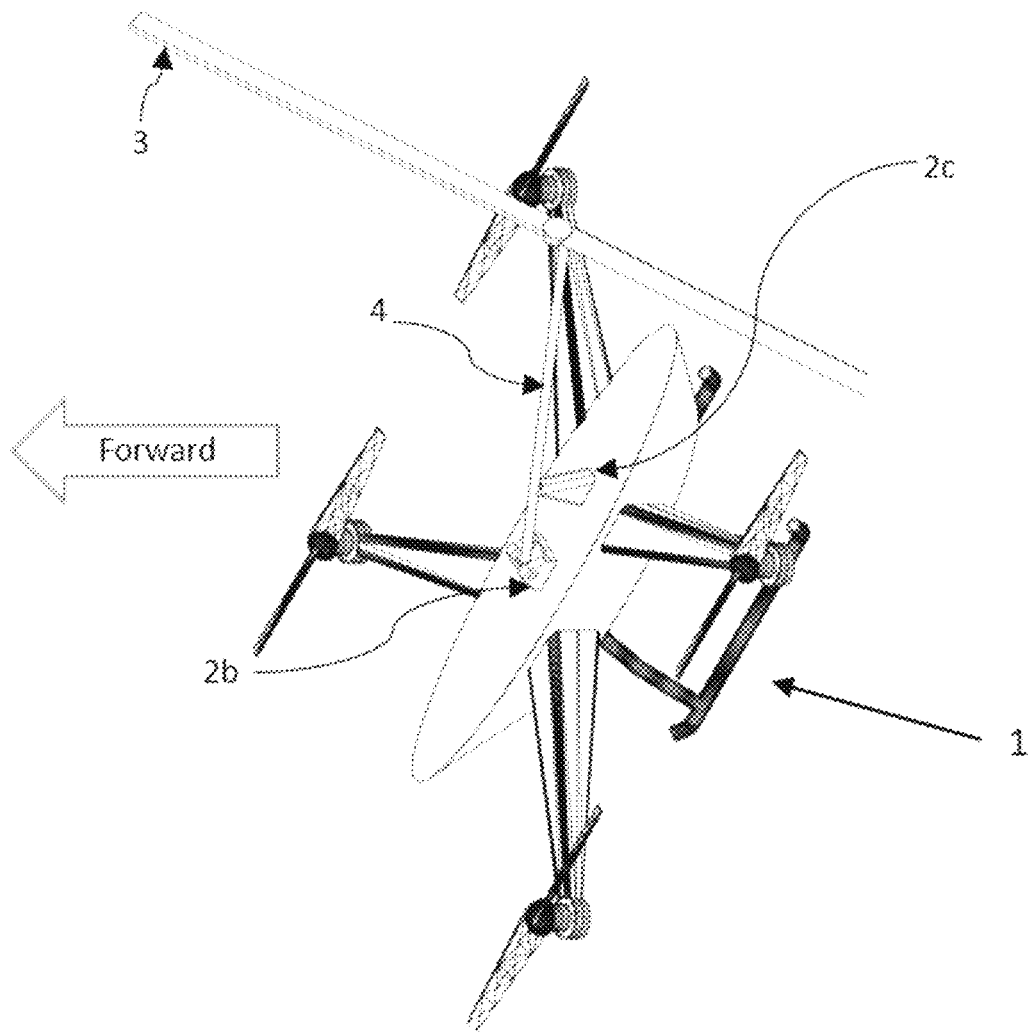
FIG. 13 shows an embodiment featuring a rotorcraft equipped with a backless rotor support hinge bracket configured for horizontal or cruise flight.
Figure 14:
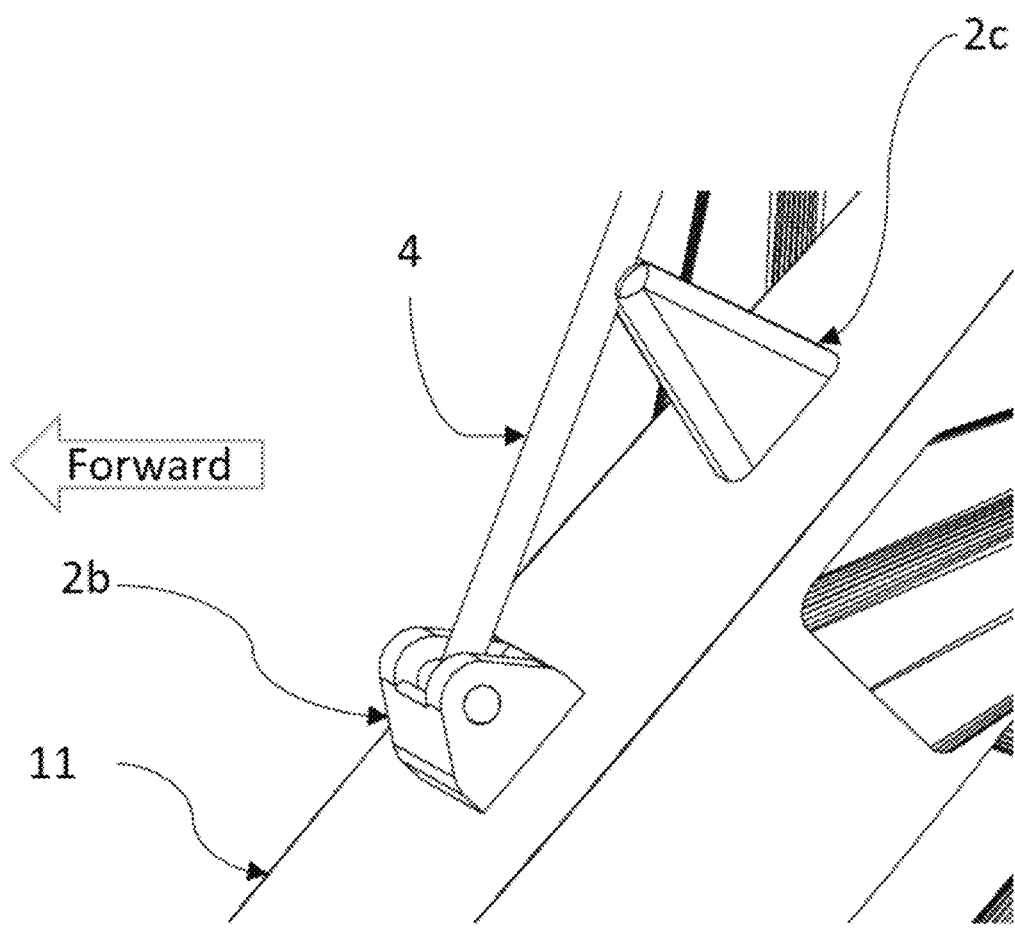
FIG. 14 is a detail of a backless rotor support hinge and standalone rotor support backstop in horizontal or cruise flight.
Figure 15:
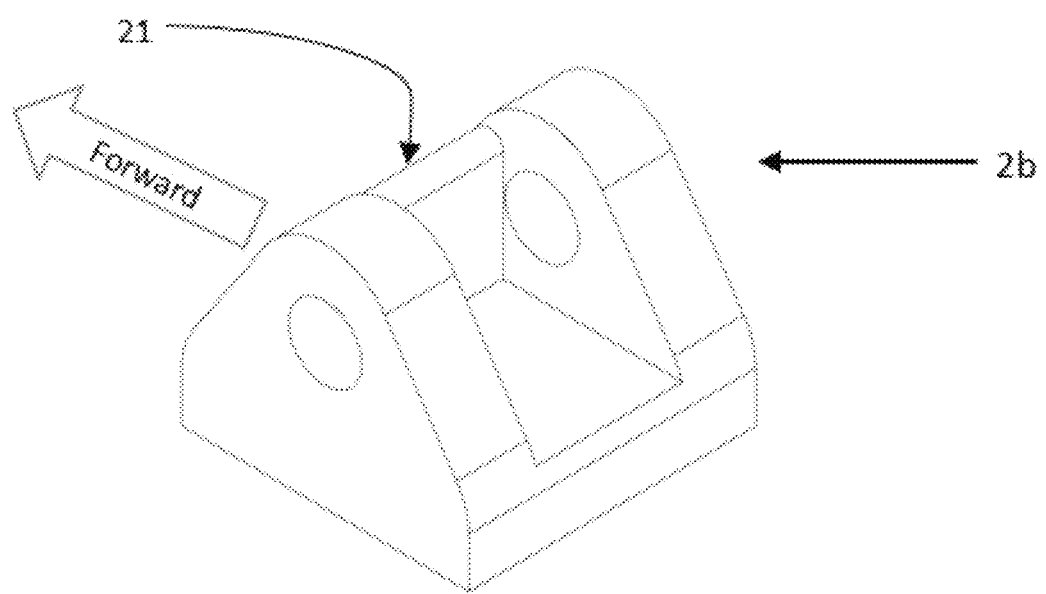
FIG. 15 is an isometric view of a backless hinge bracket.
Figure 16:
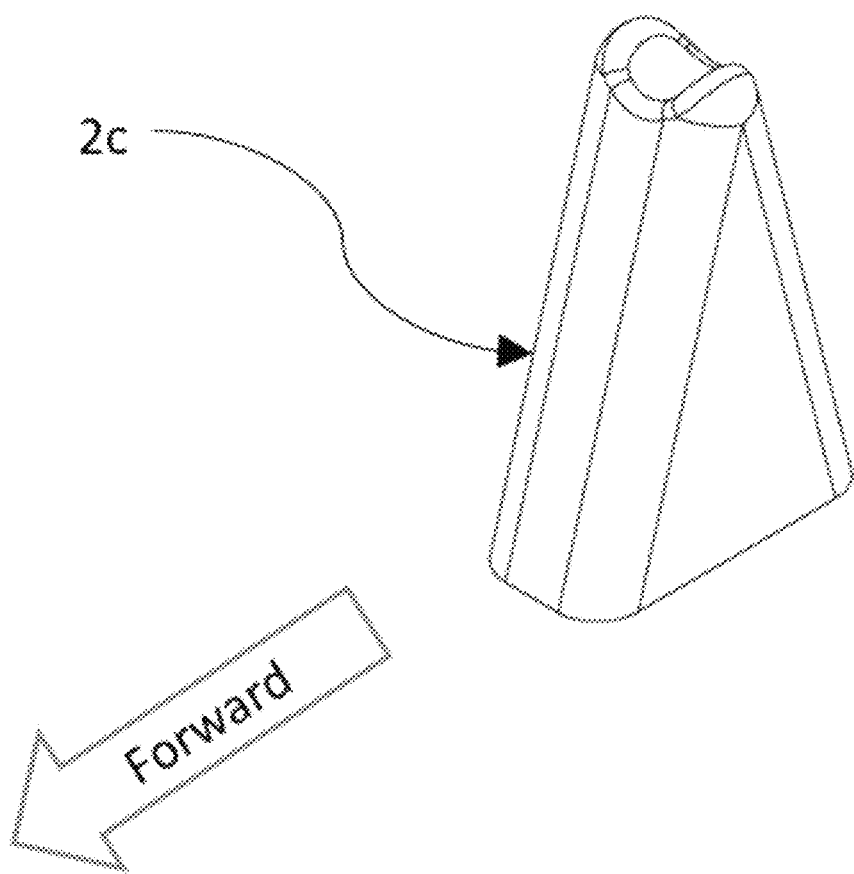
FIG. 16 is an Isometric view of a standalone backstop.

Referring to FIGS. 11, 12 and 15, an alternative embodiment of the present invention is shown in the vertical flight configuration. Rotor support 4 is prevented from pitching forward beyond a vertical position by forward stop 21 of backless hinge bracket 2b.

Referring to FIGS. 13, 14, 15 and 16, an alternative embodiment of the present invention is shown in the horizontal or cruise flight configuration. Backless hinge 2b does not have a backstop. Rotor support 4 is prevented from pitching back beyond the desired amount by standalone backstop 2c installed on fuselage 11.

Figure 17:
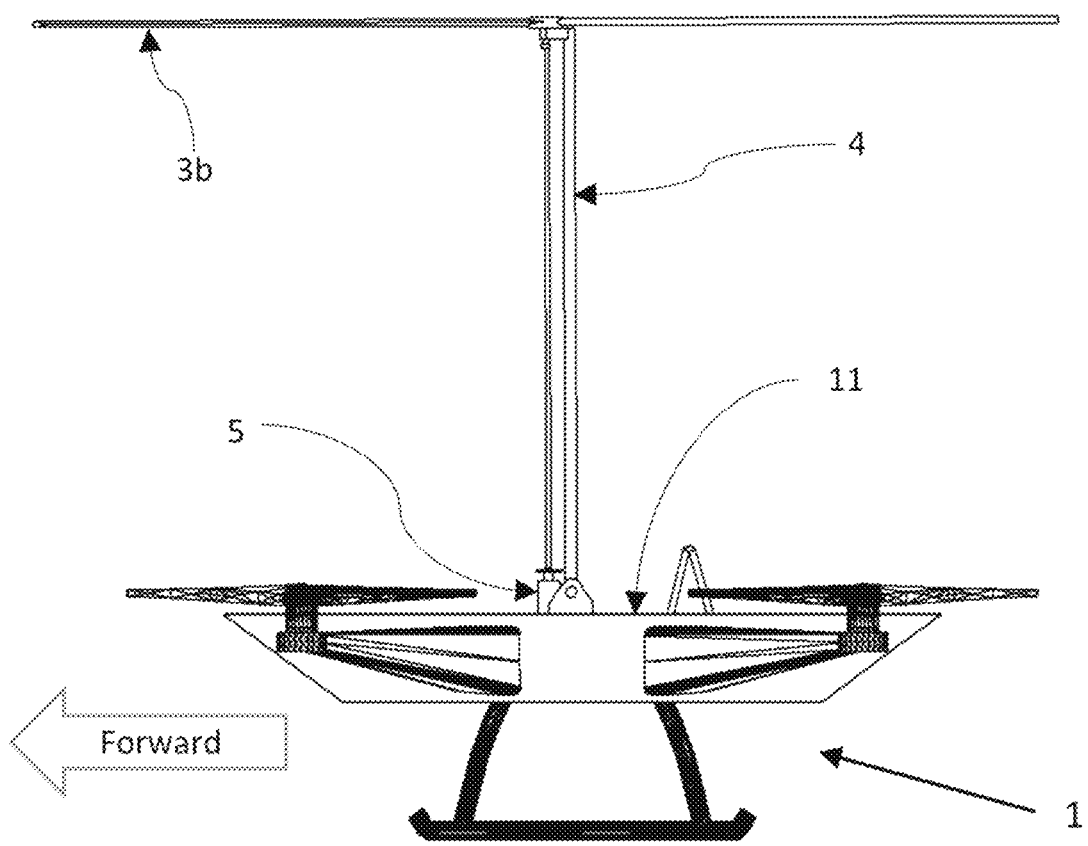
FIG. 17 shows a rotorcraft embodiment equipped with a power unit which can spin the rotor when the rotor support is vertical.
Figure 18:
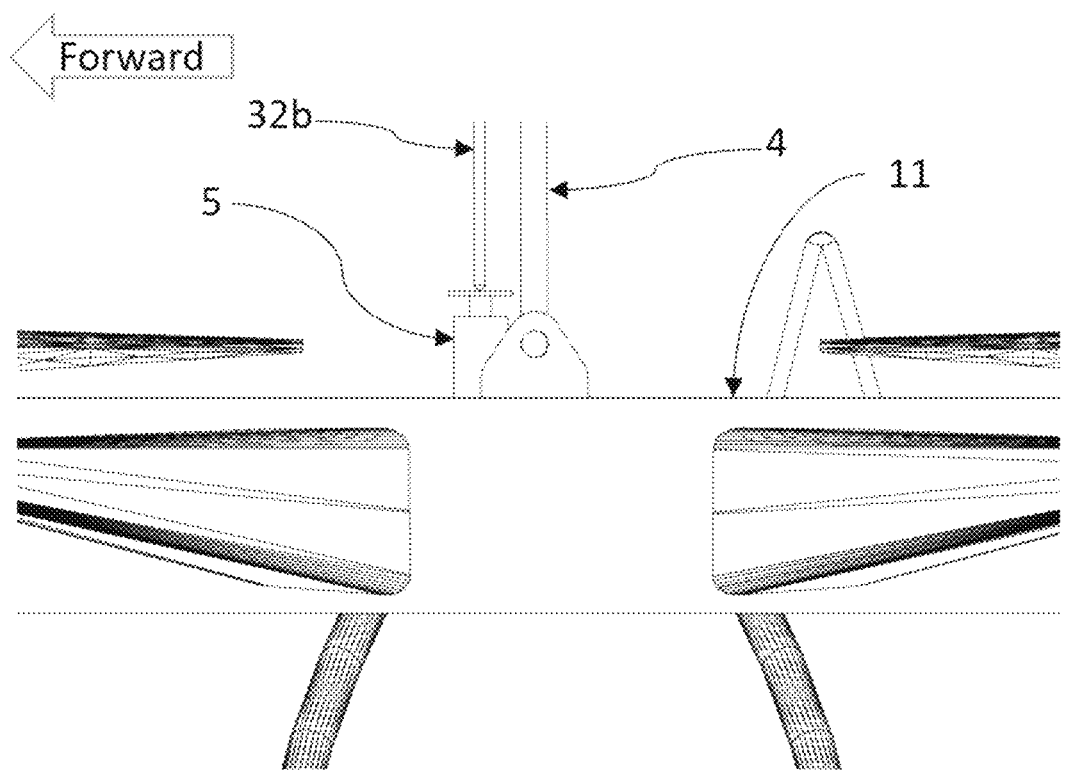
FIG. 18 shows a detail of the power unit and the rotor support in a vertical orientation.

Referring to FIGS. 17 and 18, an embodiment equipped with a rotor pre-rotator is shown in ground, hover or vertical flight configuration. Power unit 5, attached to fuselage 11, in some embodiments an electric motor, is driving extended rotor mast 32b to spin rotor 3b. Pre-rotating the rotor before the rotorcraft starts moving in the horizontal plane makes for more efficient lift generation in autorotation. In some embodiments equipped with variable pitch rotor blades, the power unit can spin the rotor to generate extra lift while the rotorcraft is moving vertically or hovering.

Figure 19:
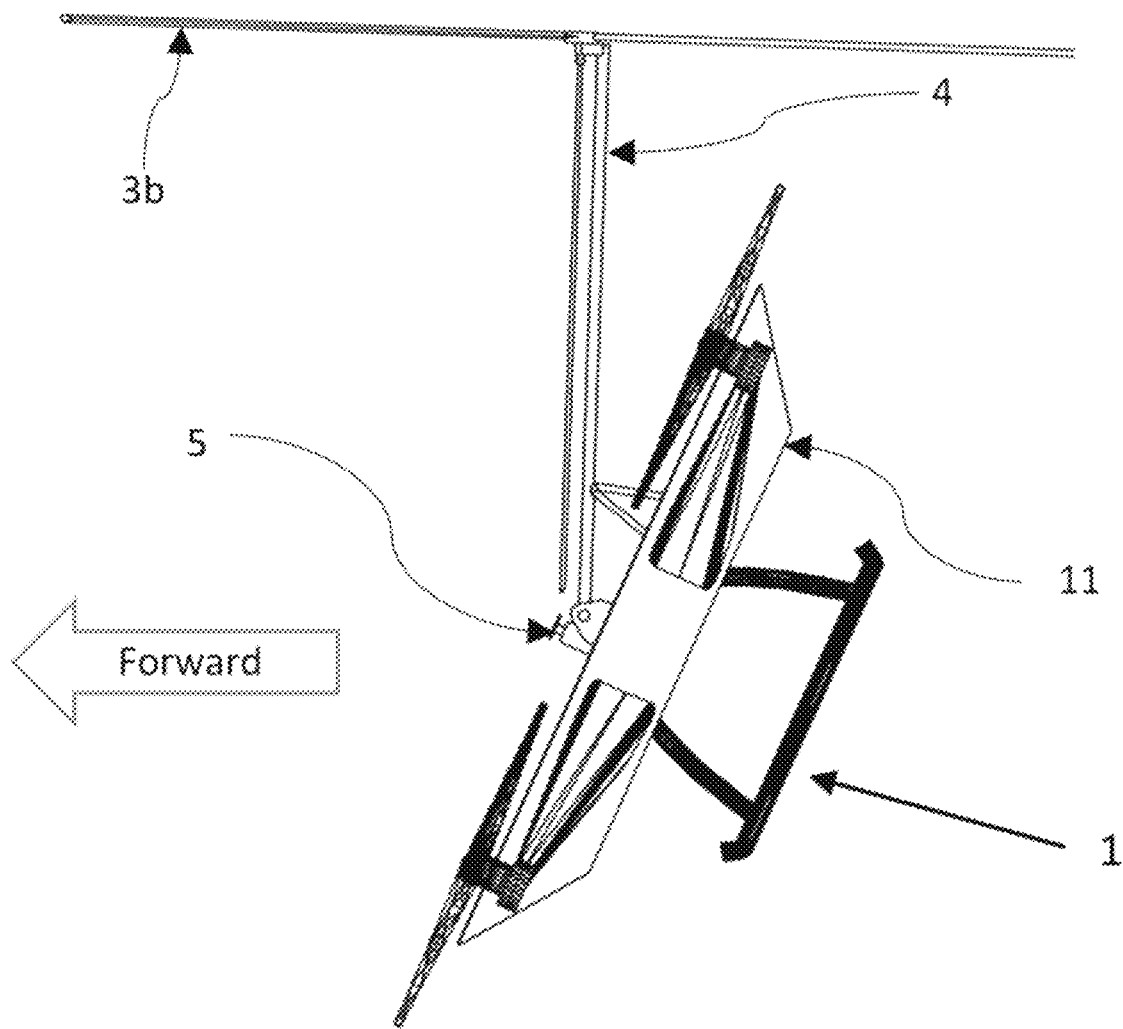
FIG. 19 shows a rotorcraft with the power unit and the rotor support configured for horizontal or cruise flight.
Figure 20:
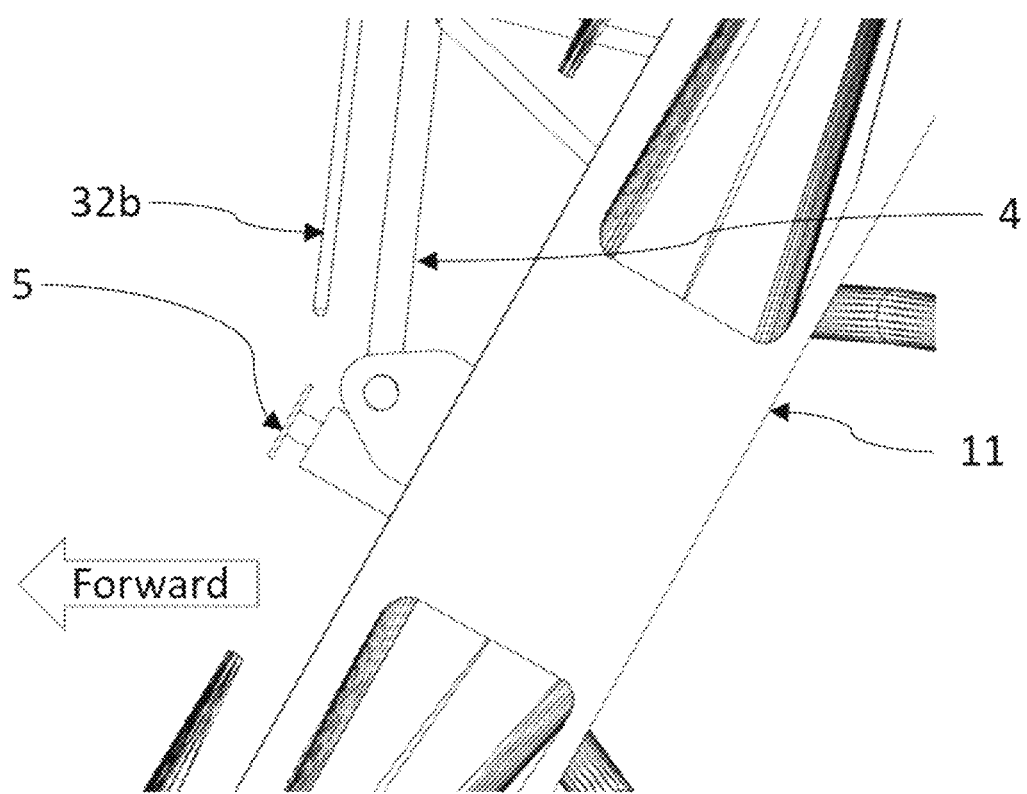
FIG. 20 shows a detail of the rotorcraft with the power unit and the rotor support configured for horizontal or cruise flight.

Referring to FIGS. 19 and 20, an embodiment equipped with a rotor pre-rotator is shown in horizontal flight or cruise configuration. Extended rotor mast 32b is separated from power unit 5, allowing rotor 3b to spin in autorotation.

Figure 21:
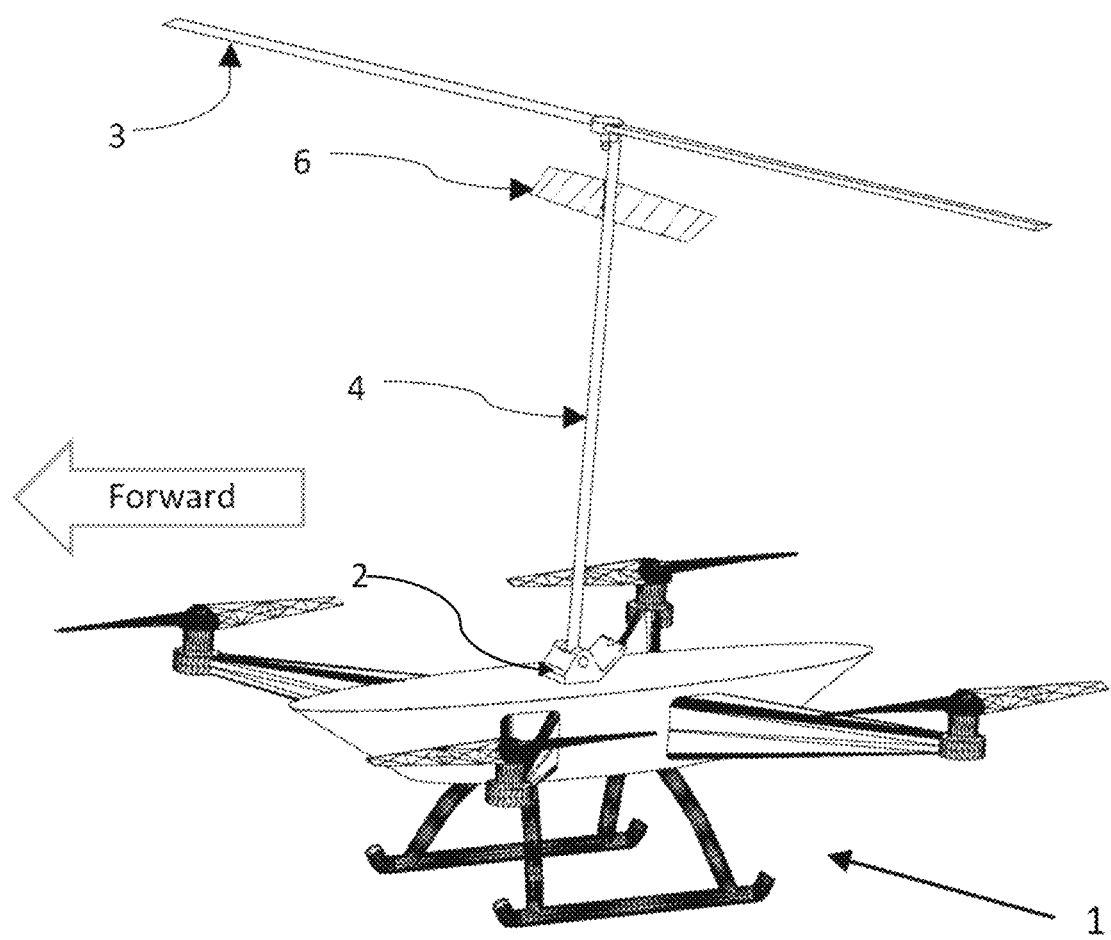
FIG. 21 shows a rotorcraft embodiment equipped with a rotor support trim fin with the rotor support in a vertical orientation.
Figure 22:
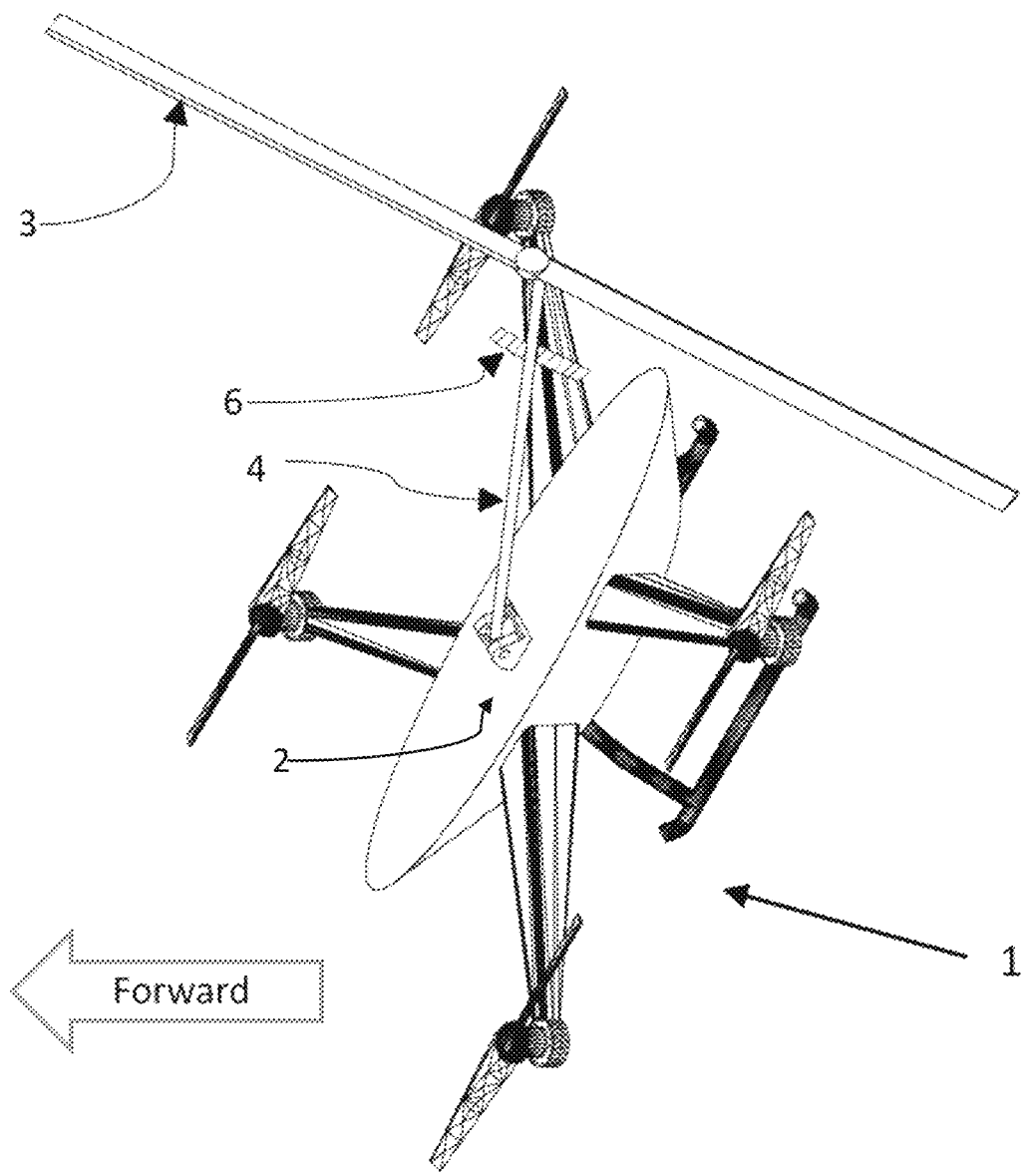
FIG. 22 shows a rotorcraft embodiment equipped with a rotor support trim fin in horizontal or cruise flight configuration.

Referring to FIGS. 6, 21 and 22, an embodiment of the present invention equipped with means to aerodynamically transition the rotor support to horizontal flight configuration is shown. Fin 6, under the influence of the relative wind from rotorcraft 1 in horizontal motion, generates a force to pivot rotor support 4 for the optimum thrust to drag ratio of rotor 3 for that flight condition. The fin can also be used to force the rotor support against the backstop 22 of hinge bracket 2 in horizontal flight. Depending on embodiments, the fin can be fixed, ground adjustable, or controllable during flight.

Some advantages of embodiments of the present invention are as follows:

The autorotating rotor, being equipped with longer blades than the multicopter's powered propellers, generates lift more efficiently, increasing the range and endurance of the rotorcraft.

If powered while in vertical flight, embodiments of the rotor equipped with variable pitch blades can supplement the lift produced by the multicopter's propellers. In contrast, if a multicopter were equipped with wings for range increase, the wings would not provide lift during vertical flight, while adding useless weight to the aircraft.

The lift provided by the autorotating rotor allows the rotorcraft to use less power for maintaining altitude while in horizontal flight. The rotorcraft can cruise efficiently in a substantially nose-down attitude in some embodiments, with the thrust vectors of the propellers more aligned with the direction of flight than in multicopters not equipped with embodiments of the present invention.

The lift provided by the autorotating rotor allows the multicopter to use less power for maintaining altitude while in horizontal flight. In some embodiments, the propellers can spin at a lower RPM during cruise, thus running quieter than multicopters not equipped with embodiments of the present invention.

Should one or more motors on a multicopter equipped with embodiments of the present invention stop producing power, the rotorcraft can make a gentle landing under autorotation. This is in contrast with current multicopters where multiple motor failures can cause the rotorcraft to descend uncontrollably. The ability to slow the descent down and cushion the landing if a flight emergency arises is especially desirable when the aircraft is carrying valuable cargo or passengers.

The invention claimed is:

1. A multicopter rotorcraft comprising:
   a fuselage;
   a plurality of arms extending from the fuselage, each arm supporting at least one electric motor driving a propeller;
   at least one rotor support assembly pivotally mounted to the fuselage, the rotor support assembly comprising:
      a hinge bracket fixed to the fuselage and including a forward stop configured to limit forward pivoting of a rotor support arm;
      the rotor support arm pivotally connected to the hinge bracket;
      a rotor mounted on the rotor support arm, the rotor comprising a hub and a plurality of blades;
      a backstop configured to limit backward pivoting of the rotor support arm, the backstop being either integrated into the hinge bracket or separately mounted on the fuselage; and
      a tilt control mechanism operatively connected to the rotor support arm and configured to pivot the rotor support arm during transition between vertical flight and horizontal flight, the tilt control mechanism comprising either an aerodynamic control system or a powered actuator;
   wherein the rotor support arm pivots between a substantially vertical orientation during the vertical flight and a tilted orientation during the horizontal flight; and
   wherein the rotor spins in autorotation during the horizontal flight to provide supplementary lift.

2. The multicopter rotorcraft of claim 1, wherein the tilt control mechanism comprises the aerodynamic control system including a control surface, a spring, and a dampener.

3. The multicopter rotorcraft of claim 1, wherein the tilt control mechanism comprises the powered actuator comprising a servomotor operatively controlled by an autopilot system.

4. The multicopter rotorcraft of claim 1, wherein the rotor is driven by a motor during vertical flight and allowed to spin freely in autorotation during the horizontal flight.

5. The multicopter rotorcraft of claim 1, wherein the tilt control mechanism automatically transitions the rotor support arm based on relative airspeed.

6. The multicopter rotorcraft of claim 1, wherein the backstop is integrated into the hinge bracket.

7. The multicopter rotorcraft of claim 1, wherein the backstop is separately mounted on the fuselage.

\* \* \* \* \*